(12) United States Patent
Nagamatsu et al.

(10) Patent No.: US 7,172,051 B2
(45) Date of Patent: Feb. 6, 2007

(54) STEERING APPARATUS FOR VEHICLE

(75) Inventors: Kazuaki Nagamatsu, Osaka (JP);
Kensaku Nakamura, Nara (JP);
Tetsuya Murakami, Nara (JP);
Takehiro Saruwatari, Osaka (JP);
Kousuke Yamanaka, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/825,566

(22) Filed: Apr. 15, 2004

(65) Prior Publication Data
US 2004/0206199 A1   Oct. 21, 2004

(30) Foreign Application Priority Data
Apr. 17, 2003   (JP) .............................. 2003-113416

(51) Int. Cl.
*B62D 5/05* (2006.01)
(52) U.S. Cl. ...................................... 180/444; 180/443
(58) Field of Classification Search ................ 180/444, 180/443, 446; 74/409, 396, 424.82, 499, 74/388 PS
See application file for complete search history.

(56) References Cited

U.S. PATENT DOCUMENTS

| | | | | |
|---|---|---|---|---|
| 4,724,714 | A | * 2/1988 | Iwasaki et al. ................ 74/396 |
| 6,129,171 | A | * 10/2000 | Takaoka ...................... 180/444 |
| 6,155,376 | A | 12/2000 | Cheng | |
| 6,164,407 | A | * 12/2000 | Cheng ......................... 180/444 |
| 6,237,713 | B1 | * 5/2001 | Onodera et al. ............. 180/444 |
| 6,662,897 | B2 | * 12/2003 | Tatewaki et al. ............ 180/444 |
| 6,702,060 | B2 | * 3/2004 | Tatewaki et al. ............ 180/444 |
| 6,763,738 | B1 | * 7/2004 | Tsutsui et al. .......... 74/388 PS |
| 6,782,771 | B2 | * 8/2004 | Oka et al. ............... 74/388 PS |
| 6,823,962 | B2 | * 11/2004 | Iwasa et al. ................. 180/444 |
| 2003/0221896 | A1 | * 12/2003 | Sasaki et al. ............... 180/444 |
| 2004/0168849 | A1 | * 9/2004 | Honaga et al. ............. 180/444 |

FOREIGN PATENT DOCUMENTS

| | | |
|---|---|---|
| EP | 1 225 117-AI | 7/2002 |
| JP | 62283066 | * 12/1987 |
| JP | 2001-187955 | 7/2001 |
| JP | 3245582 | 10/2001 |
| JP | 2002-262504 | 9/2002 |

OTHER PUBLICATIONS

Patent Abstracts of Japan, vol. 2003, No. 01, Publication No. 2002274397.

* cited by examiner

*Primary Examiner*—Anne Marie Boehler
(74) *Attorney, Agent, or Firm*—Darby & Darby (57) ABSTRACT

A nut member which is rotated by power transmission from a motor in a rack housing is supported by a thrust bearing fitted and fixed in a first housing having an integrally formed fixing section for fastening to a vehicle body so that the nut member cannot move in both directions along an axial direction. Thrust loads applied in both directions to the nut member with the conversion of rotation into movement of a steering shaft in an axial direction are carried by the first housing through the thrust bearing. The structure of the connection section of the first housing and second housing is simplified, and the housing is fixed in a stable manner to prevent deterioration in steering feeling.

5 Claims, 5 Drawing Sheets

STEERING APPARATUS FOR VEHICLE

CROSS-REFERENCE TO RELATED APPLICATIONS

This application claims priority under 35 U.S.C. § 119 from Japanese Patent Application No. 2003-113416, filed on Apr. 17, 2003.

BACKGROUND OF THE INVENTION

The present invention relates to a steering apparatus for a vehicle, which is constructed to perform steering by transmitting rotation of a motor driven according to an operation of a steering member, such as a steering wheel, to a steering shaft in a steering mechanism and moving the steering shaft in the axial direction.

A vehicle is steered by transmitting an operation of a steering member executed by a driver (in general, turning of a steering wheel) to a steering shaft in a steering mechanism (for example, a rack shaft in a rack/pinion type steering apparatus) and pushing and pulling vehicle wheels for steering (in general, the left and right front wheels) by the movement of the steering shaft in the axial direction to turn the wheels.

As a steering apparatus for a vehicle for performing such steering, an electric power steering apparatus, which is constructed to assist steering performed by mechanical power transmission from a steering member by driving a steering assist motor provided in a part of the steering mechanism, according to an operation of the steering member, and transmitting the rotation force of the motor to a steering shaft, is widely used in practical applications. Besides, a separation type steering apparatus, that is, a so-called steer-by-wire steering apparatus, which comprises a steering mechanism mechanically separated from a steering member and a steering motor provided in a part of the steering mechanism, and performs steering by only the rotation of the motor driven and controlled according to an operation of the steering member, is under development.

A steering apparatus for a vehicle comprising a steering assist motor or a steering motor as described above requires movement converting means for converting rotation of such a motor into movement in an axial direction of the steering shaft. Widely used examples of the movement converting means include a ball screw mechanism which is constructed by coaxially screwing a cylindrical nut member rotatably supported in a cylindrical housing supporting a steering shaft onto a screw groove formed over an appropriate length in the outer surface of the steering shaft, rotates the nut member by power transmission from a motor, and moves the steering shaft in an axial direction by the spiral movement of the screw groove according to the rotation, and particularly a ball screw mechanism which is constructed by screwing a screw groove in the outer circumference of a steering shaft and a nut member through a number of balls, and can highly efficiently transmit power with rolling movement of the balls (for example, U.S. Pat. No. 6,155,376).

A steering apparatus for a vehicle with the above-described screw mechanism is constructed by dividing a cylindrical housing supporting the steering shaft into a first housing and a second housing connected coaxially, supporting a nut member inside the connection section of these housings, and interactively connecting the nut member to a motor provided on the outside of the first housing or second housing so as to rotate the nut member by power transmission from the motor.

Here, reaction forces act on the nut member screwed onto the steering shaft in both directions along the axial direction with the above-mentioned movement conversion. It is therefore necessary to support the nut member by a thrust bearing capable of carrying thrust loads in both directions, and the steering apparatus for a vehicle disclosed in U.S. Pat. No. 6,155,376 adopts a support structure in which the nut member is thrust supported by a bearing held and fixed in the connection section between the first housing and second housing.

However, in this support structure, the thrust loads applied in both directions to the nut member as described above are applied to one of the first and second housings in a direction apart from the other. Therefore, great connection strength is required for the connection section of the first and second housings, and it is necessary to increase the thickness of connection flanges and the size and number of bolts for tightening the flanges, and thus this structure suffers from the drawbacks that the freedom of design is decreased and the weight of the product is increased.

Besides, in the case where the housing for supporting the steering shaft is constructed in a divided manner by the first and second housings, a fixing structure in which fixing means (fixing bracket) for fastening to a vehicle body is provided for each housing, and each fixing means is individually positioned with respect to a fixing seat on the vehicle body side and fixed by tightening a bolt, is adopted In many cases, the fixing means of the first housing is integrally constructed and the fixing means of the second housing is constructed in a separate member to enable changing of position in a circumferential direction and an axial direction, so that positioning with respect to the fixing seat on the vehicle body side is readily performed.

However, when such a fixing structure is adopted, the fixation of the second housing comprising fixing means in a separate member becomes unstable due to the function of thrust forces repeatedly applied from the nut member in the inside, and this instability may influence steering performed by the movement of the sheering shaft and deteriorate steering feeling.

BRIEF SUMMARY OF THE INVENTION

The present invention has been made with the aim of solving the above problems, and it is an object of the present invention to provide a steering apparatus for a vehicle, capable of simplifying the structure of the connection section of divided housings to store a nut member of a screw mechanism for converting rotation of a steering assist motor or a steering motor into movement of a steering shaft in an axial direction, and preventing deterioration in steering feeling due to the influence of thrust loads applied to the nut member.

A steering apparatus for a vehicle according to a first aspect is a steering apparatus for a vehicle, comprising: a steering shaft supported in a cylindrical housing so that the steering shaft can freely move in an axial direction; and a nut member screwed onto a screw groove formed in an outer circumference of the steering shaft through a rolling member and rotatably supported in the housing, for performing steering by transmitting rotation of a motor, which is driven according to steering, to the nut member and converting rotation of the nut member into movement of the steering shaft, wherein the housing is constructed by coaxially connecting a first housing having integrally formed fixing means for fastening to a vehicle body with a second housing having fixing means for fastening to the vehicle body in a separate member, and the nut member is supported by a thrust bearing fitted and fixed in the first housing so that the nut member cannot move in both directions along an axial direction.

In the first aspect, the nut member rotated by power transmission from a steering assist motor or a steering motor is supported by the thrust bearing fitted and fixed in the first housing having integrally formed fixing means for fastening to a vehicle body, thrust loads applied in both directions to the nut member with the conversion of rotation into movement of the steering shaft in an axial direction are carried by the first housing through the thrust bearing, the structure of the connection section of the first housing and second housing is simplified, and the housing is fixed in a stable manner to prevent deterioration in steering feeling.

A steering apparatus for a vehicle according to a second aspect is based on the first aspect, wherein transmission means for transmitting power from the motor to the nut member is gear transmission means comprising a large gear provided on an outer circumferential surface of the nut member and a small gear which is meshed with the large gear and rotates with power transmission from the motor, and the small gear is fixed to a projecting portion of a transmission shaft supported in a transmission housing loosely fitted into a part of the first housing or the second housing and having a mounting seat for the motor on one side, the projecting portion projecting from the other side of the transmission housing.

In the second aspect, gear transmission means is used as transmission means for transmitting power from a steering assist motor or a steering motor to the nut member, and the transmission housing supporting the transmission shaft having the small gear on the motor side is loosely fitted into a part of the first housing or the second housing so as to enable assembling in which the mesh state with the large gear on the nut member side is optimized by adjusting the position of the transmission housing.

A steering apparatus for a vehicle according to a third aspect is based on the second aspect, and comprises mesh adjusting means for adjusting a mesh state of the small gear and large gear by changing a position of the transmission housing in a radial direction within a range of loose fitting clearance between the transmission housing and the first housing or the second housing.

In the third aspect, the mesh state of the gear transmission means can be readily adjusted by moving the transmission housing in a radial direction within the range of loose fitting clearance between the transmission housing and the first housing or the second housing.

The above and further objects and features of the invention will more fully be apparent from the following detailed description with accompanying drawings.

DETAILED DESCRIPTION OF THE INVENTION

Figure 1:
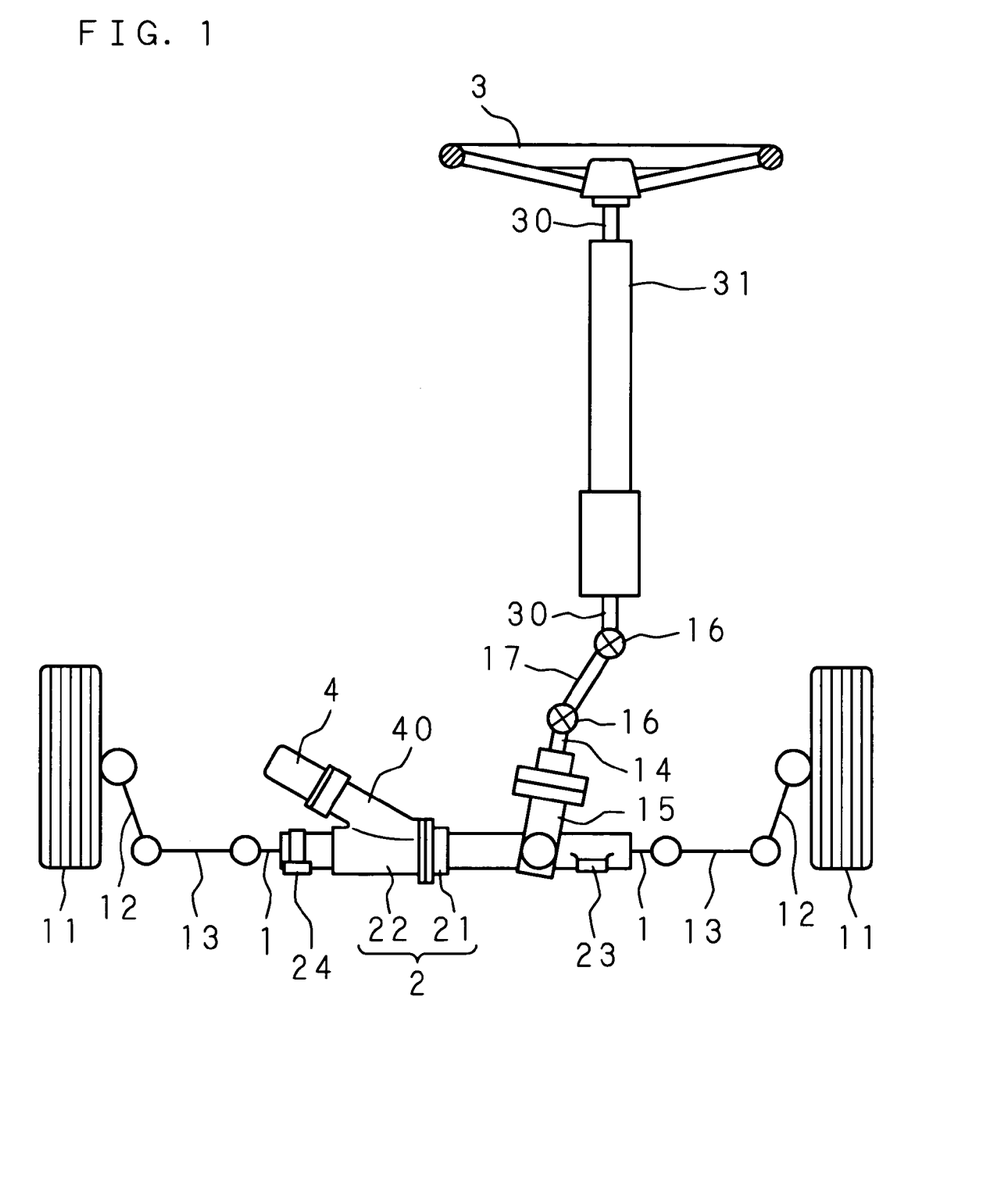
FIG. 1 is a schematic diagram showing the entire structure of a steering apparatus for a vehicle according to the present invention.

The following description will explain the present invention in detail, based on the drawings illustrating an embodiment thereof. FIG. 1 is a schematic diagram showing the entire structure of a steering apparatus for a vehicle according to the present invention. The steering apparatus for a vehicle shown in FIG. 1 is constructed as a rack/pinion type electric power steering apparatus comprising a rack/pinion type steering mechanism which operates according to turning of a steering wheel 3 as a steering member, and a motor 4 which is provided in the steering mechanism and driven to assist steering.

The steering mechanism comprises a cylindrical rack housing 2 extending in the left-right direction of a vehicle body (not shown), and a steering shaft (rack shaft) 1 supported in the rack housing 2 so that it can freely move in an axial direction. The rack housing 2 comprises a first housing 21 and a second housing 22 which are connected coaxially. For the first and second housings 21 and 22, fixing brackets 23 and 24 are provided as fixing means at separated locations, and the rack housing 2 is mounted to the vehicle body by positioning the fixing brackets 23 and 24 on respective fixing seats (not shown) provided on the vehicle body and fixing them by tightening bolts.

Note that the fixing bracket 23 of the first housing 21 is constructed integrally with the first housing 21, while the fixing bracket 24 of the second housing 22 is constructed separately from the second housing 22 so as to enable changing of position in a circumferential direction and an axial direction. Thus, mounting of the rack housing 2 to the vehicle body can be readily and accurately performed by the processes of positioning the fixing bracket 23 of the first housing 21 on a fixing seat provided on the vehicle body and tightening a bolt, and then positioning the fixing bracket 24 of the second housing 22 on a fixing seat provided on the vehicle body by changing the position as described above, and tightening a bolt.

Both ends of the steering shaft 1 supported in such a rack housing 2 are connected through tie rods 13, 13 to knuckle arms 12, 12 of the left and right front wheels 11, 11 of vehicle wheels for steering, the both ends of the steering shaft 1 projecting from one side of the first housing 21 and the other side of the second housing 22, respectively. The left and right front wheels 11, 11 are turned by pushing and pulling the knuckle arms 12, 12 through the tie rods 13, 13 by the movement of the steering shaft 1 in both directions in the rack housing 2.

In a middle of the first housing 21, a pinion housing 15 is connected in the vicinity of the fixing bracket 23 so that the axial center crosses that of the first housing 21, and a pinion shaft 14 is supported in the pinion housing 15 so that it can freely rotate on the axis. As the pinion shaft 14, only the upper end portion projecting upward from the pinion housing 15 is illustrated, and this upper end portion is connected to a column shaft 30 through an intermediate shaft 17 having universal joints 16, 16 on both ends thereof.

In the lower portion of the pinion shaft 14 extending in the pinion housing 15, a pinion (not shown) is integrally formed. Moreover, on the outer surface of the rack shaft 1 supported in the first housing 21, rack teeth (not shown) are formed over an appropriate length covering the point of crossing the pinion housing 15, and the rack teeth are meshed with the pinion provided in the lower portion of the pinion shaft 14.

The column shaft 30 connected to the upper end of such a pinion shaft 14 is supported in a cylindrical column housing 31 so that it can freely rotate coaxially, and fixedly supported in a vehicle room (not shown) in a manner tilted in an upper rear direction. The steering wheel 3 is fitted and fixed onto the upper end portion of the column shaft 30 projecting upward from the column housing 31.

With the above-described structures, when the steering wheel 3 is turned for steering, the column shaft 30 onto which the steering wheel 3 is fitted and fixed rotates on the axis, and this rotation is transmitted to the pinion shaft 14 through the intermediate shaft 17. The rotation of the pinion shaft 14 is converted into movement of the steering shaft 1 in an axial direction at the meshed section between the pinion and the rack teeth, the left and right front wheels 11, 11 are turned by this movement as described above, and steering is performed in the direction in which the steering wheel 3 is turned, according to the turned amount.

Figure 2:
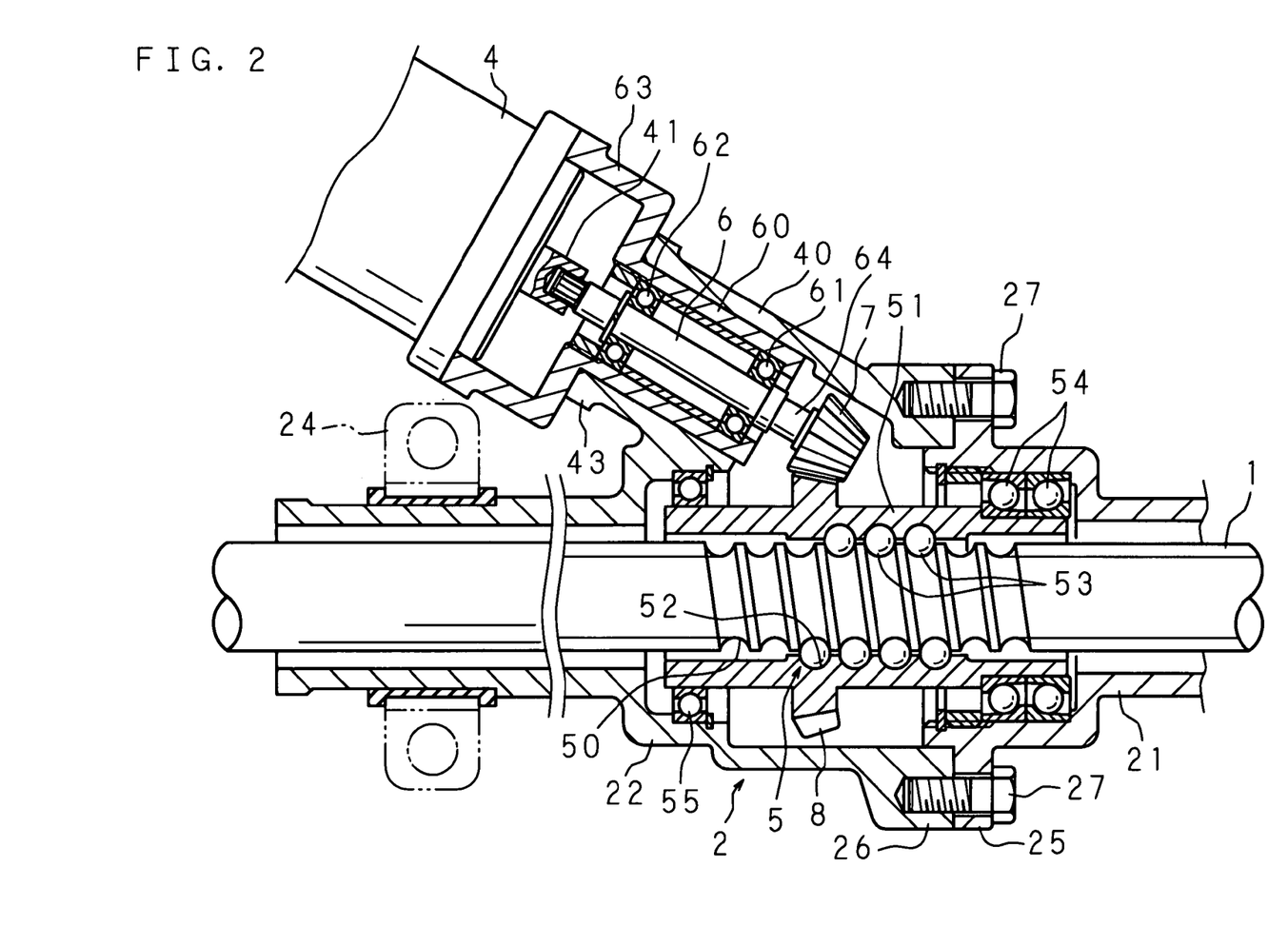
FIG. 2 is a vertical sectional view showing the inner structure of essential parts of a rack housing.

The motor 4 for assisting steering is mounted on an end of a cylindrical motor support cylinder 40 projecting outward from the second housing 22 so that its axial center is tilted from the second housing 22, and is constructed to transmit power to the steering shaft 1 supported in the rack housing 2 as follows. FIG. 2 is a vertical sectional view showing the internal structure of essential parts of the rack housing 2, that is, transmission means from the motor 4 to the steering shaft 1.

The first housing 21 and second housing 22 constituting the rack housing 2 are connected together by placing connection flanges 25 and 26 provided on the end faces of the respective housings to face each other and tightening a plurality of fixing bolts 27, 27, . . . (only two are illustrated) in a circumferential direction.

On the outer circumferential surface of the steering shaft 1 supported in the rack housing 2, a screw groove 50 having a semi-circular cross section is formed over an appropriate length in the axial direction. Moreover, in the rack housing 2, a cylindrical ball nut 51 is supported in the connection section of the first housing 21 and second housing 22 so that it can freely rotate coaxially with the steering shaft 1. In the inner circumferential surface of the ball nut 51 facing the outer circumferential surface of the steering shaft 1, a screw groove 52 having a semi-circular cross section corresponding to the screw groove 50 is formed. A ball screw mechanism 5 is constructed by screwing these screw grooves 50 and 52 together through a number of balls (rolling members) 53, 53 . . . .

Figure 3:
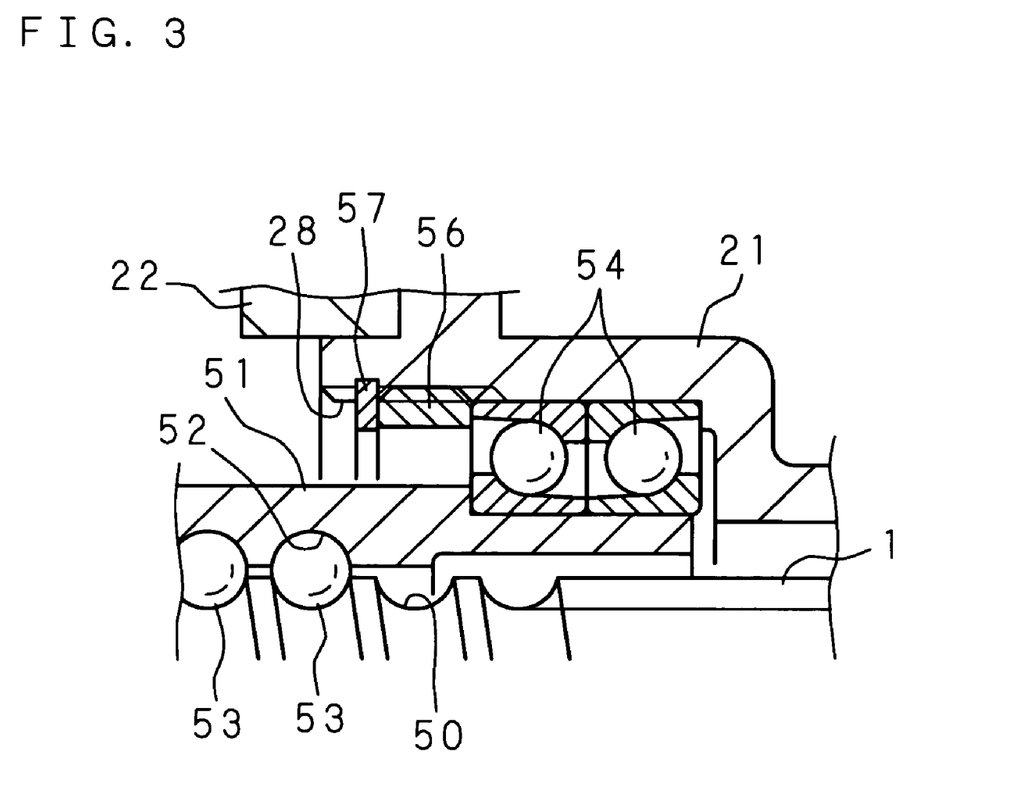
FIG. 3 is an enlarged cross sectional view of the vicinity of a support section of a ball nut with a thrust bearing.

The ball nut 51 is supported at two separate positions in the axial direction by a thrust bearing 54 fitted and held in the first housing 21 and a radial bearing 55 fitted and held in the second housing 22. FIG. 3 is an enlarged cross sectional view of the vicinity of a support section of the ball nut 51 with the thrust bearing 54.

As shown in FIG. 3 and FIG. 2, the thrust bearing 54 is a pair of angular ball bearings placed back to back, interposed between a step portion in the inner side of a bearing hole 28 opening in the connected-side end of the first housing 21 and a preload nut 56 screwed into the inner face on the opening side, and fitted and held in the bearing hole 28 by tightening the preload nut 56 and applying a predetermined load. Moreover, the other side of the preload nut 56 is brought into contact with a stopper ring 57 engaged with the inner face of the bearing hole 28 after tightening the preload nut 56, the preload nut 56 is held loosely by the function of the stopper ring 57, and a preload set by tightening during assembly is maintained. The thrust bearing 54 thus mounted can carry thrust loads applied in both directions along the axial direction to the ball nut 51 together with a radial load.

On the other hand, the radial bearing 55 fitted and held in the second housing 22 is a deep groove ball bearing, supports the vicinity of the end of the ball nut 51 on the same side so that the ball nut 51 can move in an axial direction as shown in FIG. 2, and carries only the radial load applied to this support section.

The ball nut 51 supported at two points by the thrust bearing 54 and radial bearing 55 as described above can accurately rotate with the steering shaft 1 coaxially in the rack housing 2. Moreover, since a preload is applied to the thrust bearing 54 by tightening the preload nut 56 and this preload is satisfactorily maintained by the function of the stopper ring 57 in contact with the preload nut 56, the ball nut 51 can rotate smoothly over a long time without trembling in the axial direction and radial direction.

Rotation of the ball nut 51 is transmitted to the screw groove 50 in the outer surface of the steering shaft 1 screwed into the screw groove 52 in the inner surface through a number of balls 53, 53 . . . . The steering shaft 1 is pushed in an axial direction by the function of the balls 53, 53 . . . rolling along the screw groove 50, and moved in the axial direction. With this movement, thrust loads are applied to the ball nut 51 in both directions along the axial direction, and the thrust loads are carried in both directions by the thrust bearing 54 fitted and fixed in the first housing 21. Here, the first housing 21 is firmly fixed to the vehicle body with the integrally formed fixing bracket 23, and the thrust loads carried by the thrust bearing 54 are sufficiently carried by the first housing 21 and are not transmitted to the second housing 22. It is therefore possible to decrease the thickness of both of the connection flanges 25 and 26 in the connection section of the first housing 21 and second housing 22, reduce the size and number of the fixing bolts 27, 27 . . . for connection, increase the freedom in design, and achieve a reduction in the weight of the product.

Figure 4:
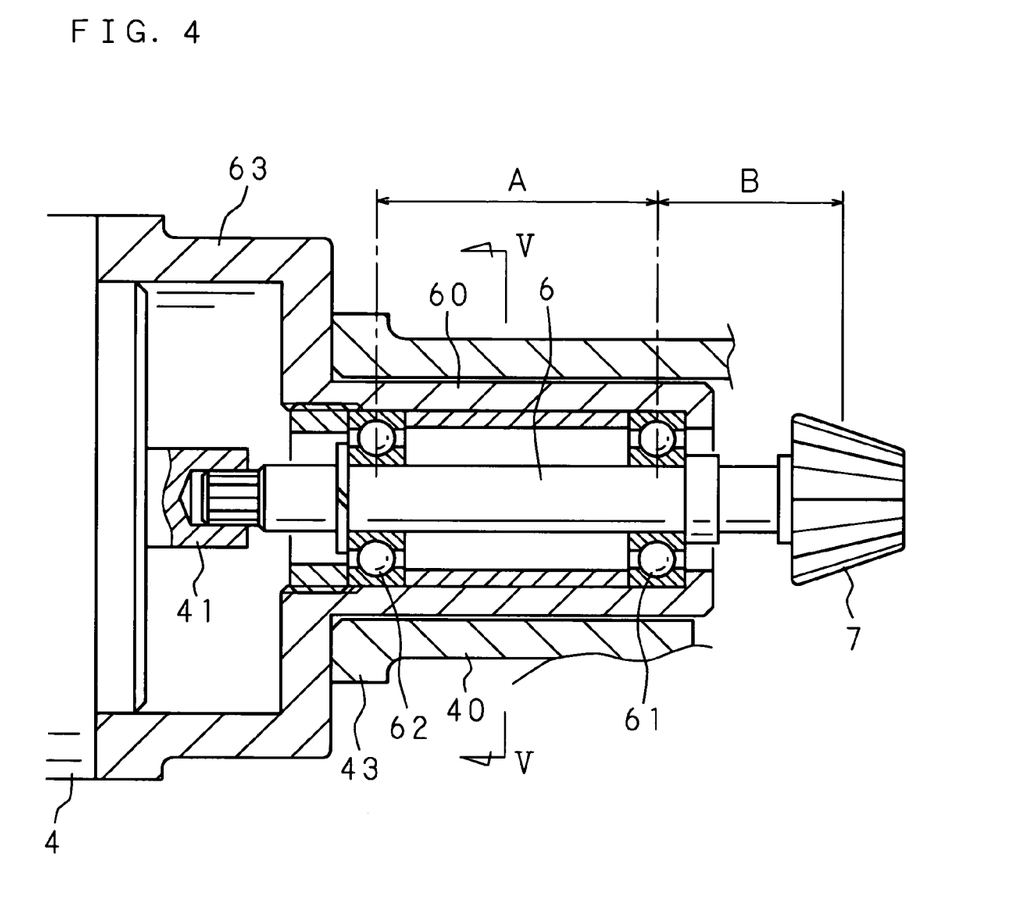
FIG. 4 is an enlarged cross sectional view of the vicinity of a mount section of a steering motor.

FIG. 4 is an enlarged cross section in the vicinity of the mount section of the motor 4. As shown in FIG. 4 and FIG. 2, a cylindrical transmission housing 60 is loosely fitted and fixed into the motor support cylinder 40 projecting outward from the second housing 22 to mount the motor 4, and a transmission shaft 6 is supported in the transmission housing 60 by a pair of ball bearings 61 and 62 at both ends. The motor 4 is fixed through a flange to a motor mounting seat 63 provided by enlarging the diameter of one end portion of the transmission housing 60.

The transmission shaft 6 projects from both sides of the transmission housing 60, and a base portion of the transmission shaft 6 projecting into the motor mounting seat 63 is spline coupled to the motor shaft 41 of the motor 4. Moreover, a small bevel gear 7 is fixed coaxially with the transmission shaft 6 extending into the rack housing 2 to an end portion 64 (projecting portion) of the transmission shaft 6 projecting from the other side of the transmission housing 60.

Thus, the motor 4 is integrated with the transmission housing 60 on the projecting side of the motor shaft 41, and is mounted on the outside of the second housing 22 as shown in FIG. 2 and FIG. 4 by loosely fitting the transmission housing 60 into the motor support cylinder 40, placing the motor fixing seat 63 on a fixing flange 43 provided on an end portion of the motor support cylinder 40 on the same side, and fixing them by a later-described process. The small bevel gear 7 fixed to the end of the transmission shaft 6 by this mounting process, projects into the second housing 22, is meshed with a large bevel gear 8 provided on a corresponding portion of the outer surface of the ball nut 51, and forms gear transmission means.

With the above-described structure, the rotation of the motor 4 is transmitted to the small bevel gear 7 through the motor shaft 41 of the motor 4 and the transmission shaft 6, reduced and transmitted to the ball nut 51 through the large bevel gear 8 meshed with the small bevel gear 7, and then rotation of the ball nut 51 caused by this transmission is converted into movement of the steering shaft 1 in an axial direction as described above.

Here, as shown in FIG. 4, a separation distance A between the ball bearings 61 and 62 supporting both end portions of the transmission shaft 6 in the transmission housing 60 is set much larger than a separation distance B between the small bevel gear 7 on an end of the transmission shaft 6 and the ball bearing 61 on the same side. It is thus possible to limit the movement of the small bevel gear 7 in a radial direction caused by the function of external force such as mesh repulsion from the large bevel gear 8, maintain a satisfactory mesh state of the small bevel gear 7 and large bevel gear 8, and perform the above-mentioned power transmission smoothly and efficiently.

Figure 5:
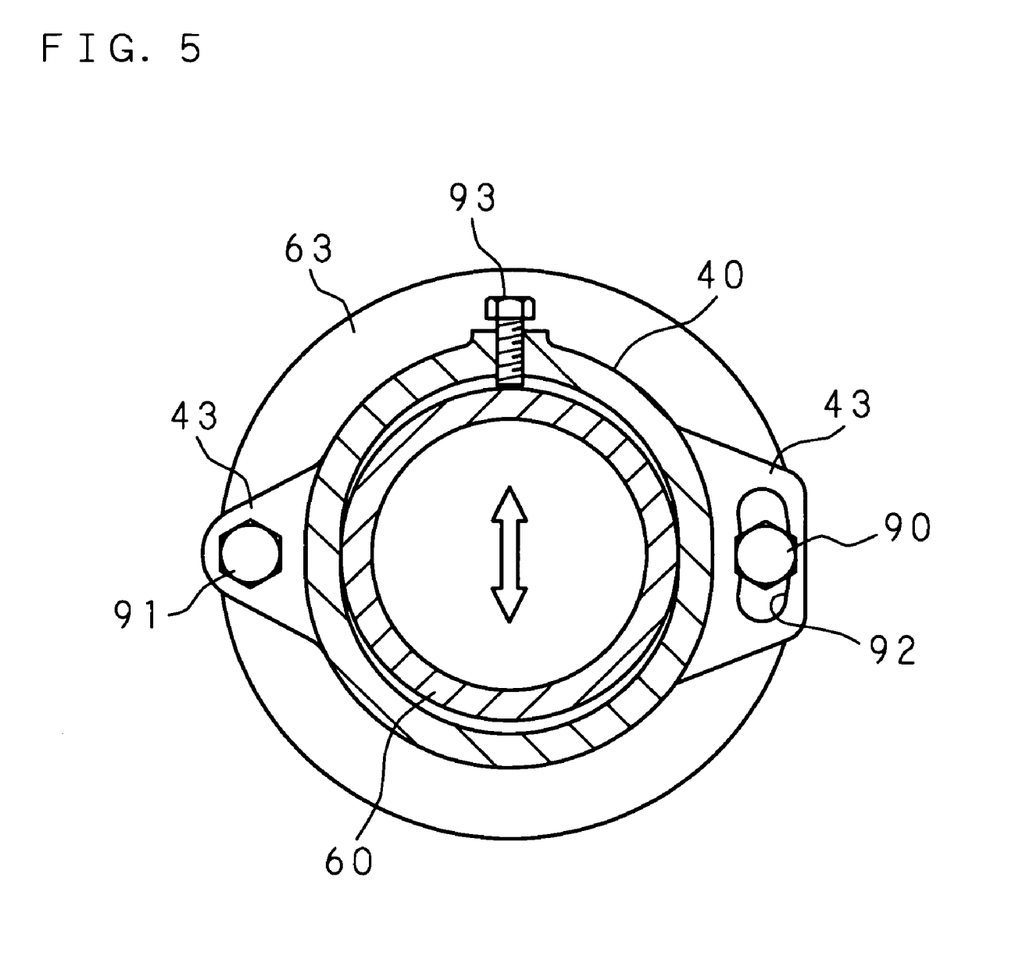
FIG. 5 is a transverse sectional view cut along the V—V line of FIG. 4, showing an example of the structure of mesh adjusting means.

Besides, the transmission housing 60 supporting the transmission shaft 6 is loosely fitted into the motor support cylinder 40 and can change the position in a radial direction within the range of the loose fitting clearance, and mesh adjusting means for adjusting the mesh state of the small bevel gear 7 and large bevel gear 8 by the changing of the position is provided. FIG. 5 is a transverse sectional view cut along the V—V line of FIG. 4, showing an example of the structure of the mesh adjusting means. As shown in FIG. 5, the inner face of the motor support cylinder 40 into which the transmission housing 60 having a circular cross section is loosely fitted is in the shape of a long hole extending to a side connected to the rack housing 2. Note that, in FIG. 5, illustration of component members inside the transmission housing 60 is omitted.

The numeral 43, 43 in FIG. 5 is a fixing flange (projecting portion) projecting from one end of the motor support cylinder 40, placed on the motor mounting seat 63 of the transmission housing 60, and connected with two fixing bolts 90 and 91 positioned to face each other in the direction of a short diameter of the motor support cylinder 40. In the mesh adjusting means shown in FIG. 5, a bolt hole 92 formed in the fixing flange 43 for insertion of one fixing bolt 90 is a long hole in the shape of an arc with the axial center of the other fixing bolt 91 as the center.

According to such a structure, after loosening the fixing bolts 90 and 91 to cancel the fastening to the motor support cylinder 40, by oscillating the transmission housing 60 by using one fixing bolt 90 inserted into the bolt hole 92 in the shape of a long hole and the other fixing bolt 91 as a pivot, it is possible to adjust the position in the direction of a long diameter of the motor support cylinder 40, namely a direction approaching or separating with respect to the rack housing 2. With this positional adjustment, the positions of the transmission shaft 6 supported in the transmission housing 60 and the small bevel gear 7 fixed to an end of the transmission shaft 6 are changed to approach or separate with respect to the large bevel gear 8 provided on the outer circumference of the ball nut 51 supported in the rack housing 2, and the mesh state of the two bevel gears 7 and 8 can be adjusted.

The positional adjustment of the transmission housing 60 can be made by holding the motor 4 fitted and fixed on the motor mounting seat 63, but, as shown in FIG. 5, it may be possible to move the transmission housing 60 by screwing an adjustment screw 93 into a screw hole penetrating the peripheral wall of the motor support cylinder 40 from one side in the long diameter direction, bringing the inner end to come into contact with the circumferential surface of the transmission housing 60, and pushing the transmission member 60 by spiral movement of the adjustment screw 93. If the moving direction of the transmission housing 60 by the spiral movement of the adjustment screw 93 is defined as a direction to reinforce the mesh between the two bevel gears 7 and 8 by pushing the small bevel gear 7 against the large bevel gear 8, it is possible to accurately adjust the mesh state and readily realize a desired mesh state.

Further, since the transmission housing 60 is moved together with the motor 4 fixed to the motor mounting seat 63, a mesh adjustment is made without deteriorating the connection state of the motor 4 and drive shaft 6. Note that the mesh state obtained by such an adjustment is maintained by tightening the fixing bolts 90, 91 and immovably fixing the transmission housing 60 and the motor support cylinder 40.

Note that, in the above-described embodiment, power transmission from the transmission shaft 6 to the ball nut 51 is performed by bevel gear transmission means comprising the small bevel gear 7 and the large bevel gear 8, but other gear transmission means such as a spur gear and hypoid gear may be used.

In addition, in the above-described embodiment, a ball screw mechanism 5 comprising balls 53 as the rolling member is used to convert the rotation of the motor 4 into movement of the steering shaft 1 in an axial direction, but it may be possible to use a mechanism comprising a bearing as the rolling member, i.e., a so-called bearing screw, as disclosed in Japanese Patent Application Laid-Open No. 2001-187955.

Moreover, although the above-described embodiment illustrates an example of application to a rack/pinion type electric power steering apparatus for transmitting rotation of the steering assist motor 4 to the rack shaft as the steering shaft, the present invention is also applicable to electric power steering apparatuses of any type constructed to assist steering by transmitting rotation of the motor to the steering shaft in the steering mechanism. Further, needless to say, the present invention can also be applied for power transmission from the motor to the steering shaft not only to an electric power steering apparatus, but also to a steer-by-wire type steering apparatus, which comprises a steering mechanism mechanically separated from a steering member and performs steering by only the rotation of a motor provided in a part of the steering mechanism, and the same effects can be obtained.

As described in detail above, a steering apparatus for a vehicle of the present invention can simplify the structure of the connection section of a housing divided in the axial direction, increase the degree of freedom in design and reduce the weight of the product, and can also maintain the fixed state of the housing in the stable manner and prevent deterioration in steering feeling.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A steering apparatus for a vehicle, comprising:

a steering shaft supported in a cylindrical housing so that the steering shaft can freely move in an axial direction; and a nut member screwed onto a screw groove formed in an outer circumference of the steering shaft through a rolling member and rotatably supported in the housing, wherein steering is performed by transmitting rotation of a motor, which is driven according to steering, to the nut member and converting rotation of the nut member into movement of the steering shaft, the housing is constructed by coaxially connecting a first housing having an integrally formed fixing section for fastening to a vehicle body with a second housing having a fixing section for fastening to the vehicle body in a separate member, the first housing connects a pinion housing for supporting a pinion shaft having a pinion for meshing with rack teeth of the steering shaft, the nut member is supported by a thrust bearing fitted and fixed in the first housing so that the nut member cannot move in both directions along an axial direction, a radial bearing is fitted and fixed in the second housing, wherein the nut member is respectively supported at two points along an axis of the nut member by the thrust bearing and the radial bearing, the thrust bearing comprises a pair of angular ball bearings placed back to back, and an axis line of the motor is inclined from an axis of the steering shaft toward an axis of the pinion shaft.

2. The steering apparatus for a vehicle as set forth in claim 1, wherein a transmission section for transmitting power from the motor to the nut member is a gear transmission section comprising a large gear provided on an outer circumferential surface of the nut member and a small gear which is meshed with the large gear and rotates with power transmission from the motor, the small gear is fixed to a projecting portion of a transmission shaft supported in a transmission housing loosely fitted into a part of the first housing or the second housing and having a mounting seat for the motor on one side, the projecting portion projecting from the other side of the transmission housing.

3. The steering apparatus for a vehicle as set forth in claim 2, further comprising a mesh adjusting section for adjusting a mesh state of the small gear and large gear by changing a position of the transmission housing in a radial direction within a range of loose fitting clearance between the transmission housing and the first housing or the second housing.

4. The steering apparatus for a vehicle as set forth in claim 3, wherein a transmission housing is loosely fitted and fixed within a motor support cylinder projecting outward from a first housing or the second housing, and an adjustment screw is provided as the mesh adjusting section which is capable of applying an adjusting force to the transmission housing by penetrating a peripheral wall of the motor support cylinder from the outside to the inside thereof so as to move the transmission housing within the motor support cylinder by spiral movement of the adjustment screw.

5. The steering apparatus for a vehicle as set forth in claim 1, wherein the angular ball bearings are fixed by a preload nut that is loosely held by a stopper ring.

* * * * *